United States Patent [19]
Ives et al.

[11] 3,955,174
[45] May 4, 1976

[54] DIRECTION INDICATOR SYSTEM FOR ROAD VEHICLES WITH TRAILER ADAPTER MEANS

[75] Inventors: Andrew Peter Ives, Solihull; Duncan Barry Hodgson, Leamington; Allan Stanley Buckle, Kenilworth; Raymond Paul Halmshaw, Redditch, all of England

[73] Assignee: C.A.V. Limited, Birmingham, England

[22] Filed: Apr. 8, 1974

[21] Appl. No.: 458,981

Related U.S. Application Data

[63] Continuation of Ser. No. 353,015, April 20, 1973, abandoned.

[30] Foreign Application Priority Data
Apr. 20, 1972 United Kingdom............... 18493/72

[52] U.S. Cl. ................................. 340/73; 340/80; 340/81 R; 340/251; 307/10 LS
[51] Int. Cl.² .......................................... B60Q 1/34
[58] Field of Search.......... 340/73, 80, 81 R, 248 A, 340/248 B, 79, 251, 251 R; 315/82; 307/10 LS, 231, 234, 235; 328/146, 147, 148

[56] References Cited
UNITED STATES PATENTS

| | | | |
|---|---|---|---|
| 3,604,949 | 9/1971 | Conzelmann et al. ............... | 340/251 |
| 3,708,791 | 1/1973 | Curran et al. ....................... | 328/147 |
| 3,735,378 | 5/1976 | McNamee ........................... | 340/248 A |

*Primary Examiner*—John W. Caldwell
*Assistant Examiner*—Donnie L. Crosland
*Attorney, Agent, or Firm*—Holman & Stern

[57] ABSTRACT

A direction indicator system for road vehicles, comprises an electrical circuit which is in the form of a single integrated circuit and which includes circuitry means externally connectible in at least two alternative ways to enable the indicator system to operate in any one of at least two different modes.

11 Claims, 1 Drawing Figure

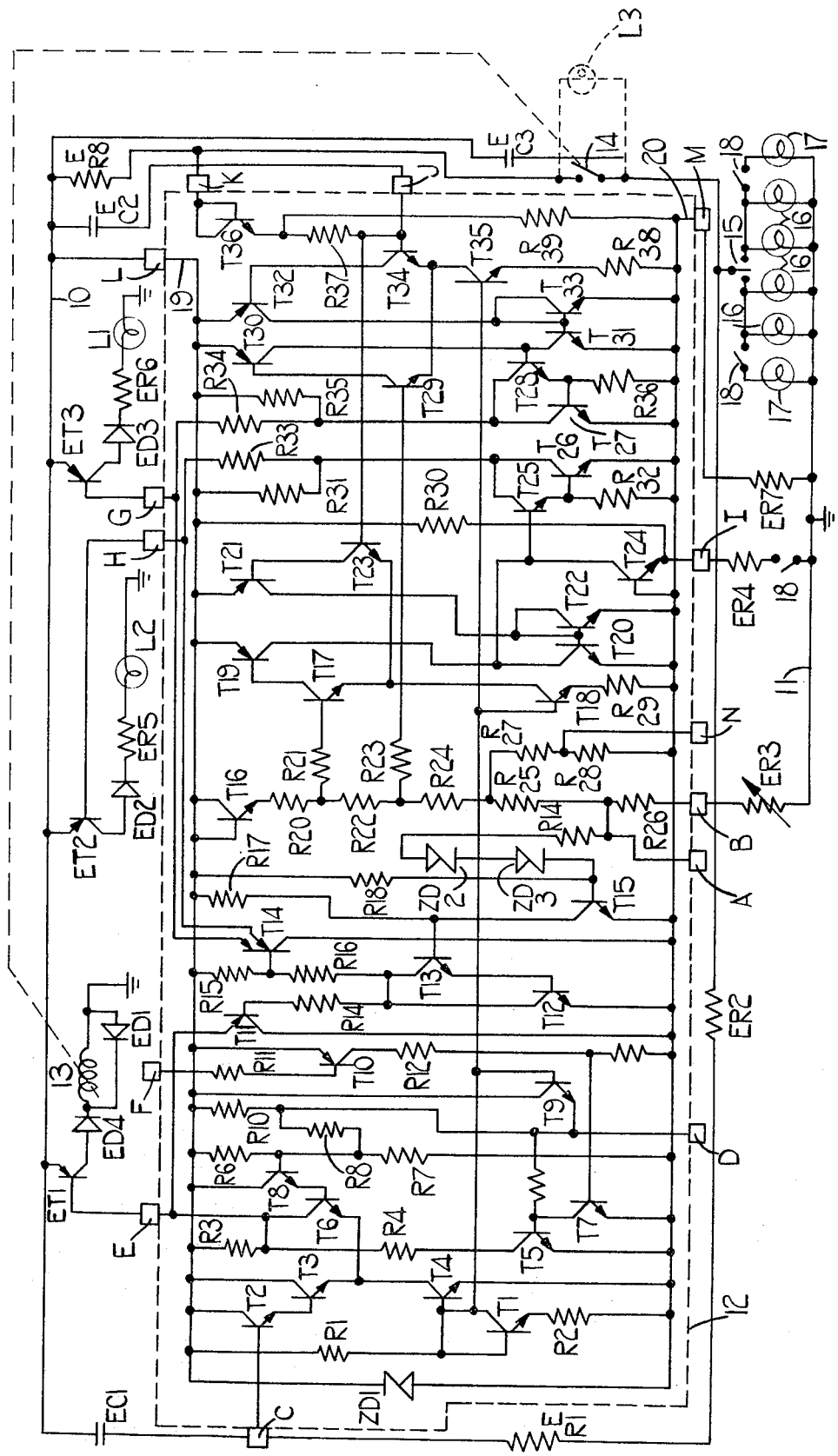

DIRECTION INDICATOR SYSTEM FOR ROAD VEHICLES WITH TRAILER ADAPTER MEANS

This is a continuation, of application Ser. No. 353,015, filed Apr. 20, 1973, now abandoned.

This invention relates to a direction indicator system for road vehicles and has as its object the provision of such a system in a convenient form.

The invention resides in a direction indicator system for road vehicles, comprising an electrical circuit which is in the form of a single integrated circuit and which includes circuitry means externally connectible in at least two alternative ways to enable the indicator system to operate in any one of at least two different modes.

Preferably, said circuitry means is externally connectible in three alternative ways to enable the indicator system to operate in any one of three different modes.

Preferably, said circuitry means includes means for causing two pilot lamps to flash in synchronism and in phase with main vehicle indicator lamps under normal conditions with a vehicle trailer attached to said vehicle, for causing one of the pilot lamps to cease to flash if one main indicator lamp fails or the trailer is disconnected, and for causing both pilot lamps to cease to flash if two main indicator lamps fail or with the trailer disconnected if one main indicator lamp fails.

Preferably, said circuitry means includes means for causing a single pilot lamp to flash in synchronism and in phase with the main vehicle indicator lamps under normal conditions with or without a vehicle trailer attached and for causing said pilot lamp to cease to flash when one or more of the main indicator lamps fails.

Preferably, said circuitry means includes means for causing a single pilot lamp to flash in synchronism and in anti-phase with the main indicator lamps under normal conditions and for causing the pilot lamp to remain off and the main indicator lamps to remain on if one or more of the main indicator lamps fails.

The invention will now be more particularly described with reference to the accompanying drawing which is a circuit diagram illustrating a direction indicator system of a road vehicle and including one embodiment of an electrical circuit constructed in accordance with the present invention.

Referring to the drawing, the direction indicator system shown therein comprises a pair of supply lines 10 and 11 connected respectively to the positive terminal of a vehicle battery and ground, and an electrical circuit formed as an integrated circuit 12. The latter has fourteen terminals and it includes an electronic flasher circuit for switching a p n p transistor ET1 which in turn energises a relay coil 13 having a pair of contacts 14 associated therewith. The transistor ET1 has its emitter connected directly to the supply line 10, its base connected to the terminal E of the integrated circuit 12 and its collector connected to the anode of a diode ED4, the cathode of which is connected to ground through the relay coil 13 which is bridged by a diode ED1, the cathode of which is connected to the cathode of the diode ED4. One of the pairs of contacts 14 is connected through a resistor ER8 to the supply line 10 and the other contact is connected on the one hand to the movable contact of a direction selection switch 15, and on the other hand through capacitor EC3 to supply line 10. the two fixed contacts of the direction selection switch 15 are each respectively connected to ground through two parallel connected direction indicator lamps 16. If a trailer is connected to the road vehicle then each fixed contact is connected to ground through a further direction indicator lamp 17 which is connected in parallel with the two associated lamps 16 by inserting a trailer plug 18.

The single integrated circuit 12 has its own internal voltage regulator in the form of a zener diode ZD1, the cathode of which is internally connected to terminal L of the integrated circuit and the anode of which is internally connected to terminal M of the integrated circuit. Terminal L is externally connected to the supply line 10 and terminal M is externally connected through a resistor ER7 to the supply line 11.

The aforesaid electronic flasher circuit comprises a pair of supply lines 19 and 20 connected respectively to the cathode and anode of the zener diode ZD1. The electronic flasher circuit further comprises a voltage comparator circuit formed by a long tailed pair which comprises four n p n transistors T2, T3, T6, and T8. The transistor T2 has its collector connected to the supply line 19, its base internally connected to terminal C of the integrated circuit and its emitter connected directly to the base of the transistor T3, the collector of which is also connected to the supply line 19.

The transistor T8 has its collector connected to the supply line 19 and its emitter connected directly to the base of the transistor T6, the collector of which is connected internally to the terminal E of the integrated circuit and to the supply line 19 through a resistor R3. The emitters of the two transistors T3 and T6 are connected together and are also connected to the supply line 20 through the collector emitter circuit of an n p n transistor T4 which serves as a current source. The base of transistor T4 is connected on the one hand to the base and collector of transistor T1 and on the other hand through resistor R1 to supply line 19. The emitter of transistor T1 is connected through resistor R2 to supply line 20. A two level reference voltage is provided at the base of the transistor T8 by a resistor chain comprising two resistors R6 and R7 connected in series between the supply lines 19 and 20, and a resistor R8 which is connected between the junction of the resistors R6 and R7 and the junction of a resistor R10, the emitter of a transistor T9 and terminal D of the integrated circuit. The resistor R8 is connected to the supply line 19 through the resistor R10 and the base of the transistor T8 is connected to the junction of the resistors R6 and R7. The collector of transistor T9 is connected to the supply line 19 and the base of the transistor T9 is connected to the base and collector of the transistor T1. Terminal D is externally connected through a resistor ER2 to the junction of said other contact of the pair of contacts 14 and the movable arm of the switch 15, terminal D being further connected externally through a resistor ER1 to the terminal C which is also externally connected through a capacitor EC1 to the supply line 10.

The integrated circuit further comprises a circuit for preventing the electronic flasher circuit from operating when the integrated circuit is connected for one mode of operation and at least one of the lamps 16 and/or 17 fails. This circuit comprises n p n transistors T5 and T7, p n p transistor T10 and resistors R4, R5, R11, R12 and R13. The collector of transistor T5 is connected through resistor R4 to terminal E of the integrated circuit. The emitter of the transistor T5 is connected to the supply line 20 and the base of the transistor T5 is connected to the collector of the transistor T7 and through the resistor R5 to terminal D of the integrated circuit. The emitter of the transistor T7 is connected to the supply line 20 and its base is connected through resistor R13 to the supply line 20 and through resistor R12 to the collector of the transistor T10. The emitter of transistor T10 is connected to the supply line 19 and its base is connected through resistor R11 to terminal F of the integrated circuit. Various modes of operation of the circuit may be achieved by connecting terminal F to either or both of terminals G and H, or to terminal M.

A lamp failure sensing circuit comprising two voltage comparators each capable of driving a transistor ET2 and hence a pilot lamp L1, L2 or terminal F of the integrated circuit, a reference voltage source and resistor ER8 which serves as a current sensing resistor. The reference voltage source comprises five series connected resistors R20, R22, R24, R27 and R28. Those series resistors are connected between the emitter of an n p n transistor T16 and the supply line 20. The collector and base of the transistor T16 are connected together and to the supply line 19. The junction of the resistors R27 and R28 is connected terminal N of the integrated circuit and this latter terminal may be connected to terminal M of the integrated circuit. The reference voltage source also includes a vehicle battery voltage sensing circuit comprising a pair of series connected resistors R25 and R26 which are connected between the junction of the resistors R24 and R27 and terminal B of the integrated circuit. The junction of the resistors R25 and R26 is connected to terminal A of the integrated circuit. In operation either of the terminals A, B may be connected through a variable resistor ER3 to the supply line 11.

The junction of the resistor ER8 and the pair of contacts 14 is externally connected to terminal K of the integrated circuit 12. An n p n transistor T36 has its base and collector internally connected to the terminal K and its emitter connected through a resistor R39 to the supply line 20.

The aforesaid two voltage comparators each capable of driving a transistor ET2, ET3 and hence a pilot lamp L1, L2 respectively or terminal F of the integrated circuit, each comprise a long tail pair. One of these long tail pairs comprises a pair of n p n transistors T17 and T23, the emitters of which are connected together and also connected to the collector of the n p n transistor T18, the emitter of which is connected through a resistor R29 to the supply line 20. The base of transistor T18 is connected to the base and collector of transistor T1. The base of the transistor T17 is connected through a resistor R21 to the junction of the resistors R20 and R22 and the collector of the transistor T17 is connected to the base of transistor T19, the emitter of which is connected to supply line 19 and the collector of which is connected to the collector of transistor T20. The collector of transistor T23 is connected to the base of transistor T21 which has its emitter connected to line 19 and its collector connected to both the collector and base of an n p n transistor T22 and to the base of transistor T20. The emitters of the two transistors T20 and T22 are connected to the supply line 20 and the collector of the transistor T20 also is connected to a base of an n p n transistor T25 and the collector of the transistor T24. The base of the transistor T24 is connected to the supply line 20 and the emitter of the transistor T24 is connected on the one hand to the terminal I of the integrated circuit and on the other hand through resistor R30 to the supply line 19. The terminal I may be externally connected through a series circuit comprising a resistor ER4 and normally open trailer plug contacts 18 to the supply line 11. The contacts 18 are closed when the aforesaid trailer is connected to the road vehicle. The collector of the transistor T25 is connected to the collector of the transistor T26 and the emitter of the transistor T25 is connected on the one hand through a resistor R32 to a supply line 20 and on the other hand to the base of an n p n transistor T26. The emitter of the transistor T26 is connected to the supply line 20 and the collector of the transistor T26 is connected on the one hand through a resistor R33 to terminal H of the integrated circuit 12 and on the other hand through resistor R31 to the supply line 19.

The other long tail pair comprises two n p n transistors T29 and T34, the emitters of which are connected together and are also connected to the collector of the n p n transistor T35, the emitter of which is connected through a resistor R38 to the supply line 20. The base of transistor T35 is connected to the base and collector of transistor T1. The base of the transistor T29 is connected through a resistor R23 to the junction of the two resistors R22 and R24. The bases of the transistors T23 and T24 are connected to terminal J and one end of a resistor R37 the other end of which is connected to the junction of the emitter of the transistor T36 and the resistor R39 the other end of which is connected to supply line 20. Terminal J of the integrated circuit 12 is externally connected through capacitor EC2 to supply line 10. The collectors of the transistors T29 and T34 are connected respectively to the bases of p n p transistors T30 and T32, the emitters of which are connected to the supply line 19. The collector of the transistor T32 is connected on the one hand to the collector and base of an n p n transistor T33 and on the other hand to the base of transistor T31. The emitters of the transistors T31 and T33 are connected to the supply line 20 and the collector of the transistor T31 is connected on the one hand to the collector of the transistor T30 and on the other hand to the base of an n p n transistor T28, the collector of which is connected to the collector of transistor T27 and the emitter of which is connected through resistor R36 to the supply line 20 and to the base of transistor T27. The collector of transistor T27 is also connected on the one hand to the supply line 19 through resistor R35 and on the other hand to the terminal G of the integrated circuit through resistor R34. The emitter of the transistor T27 is connected to the supply line 20.

Finally, the integrated circuit comprises an over-voltage protection circuit consisting of transistors T11, T12, T13, T14, T15, resistors R14, R15, R16, R17, R18, R19 and zener diodes ZD2 and ZD3. Resistor R19 is connected between the junction of aforementioned resistors R25 and R26 and the anode of zener diode ZD2. The cathode of ZD2 is connected to the anode of ZD3 the cathode of which is connected to the base of n p n transistor T15 and through resistor R18 to the supply line 19. The transistor T15 has its emitter connected to supply line 20 and its collector connected both to the base of transistor T13 and through resistor R17 to the supply line 19. The transistor T13 has its emitter connected to the base of transistor T12 and its collector connected to the collector of transistor T12.

The emitter of the transistor T12 is connected to the supply line 20 whilst its collector is connected through resistors R14 and R16 to the base of p n p transistor T11 and double emitter p n p transistor T14 respectively. The base of p n p transistor T14 is also connected through resistor R15 to the supply line 19. The collectors of transistors T11 and T14 are connected to the supply line 20 whilst the emitter of the transistor T11 is connected to terminal E of the integrated circuit 12 and the emitters of transistor T14 are connected to terminals H and G of the integrated circuit 12 respectively.

The above described single integrated circuit 12 is capable of being used in any one of three possible modes of operation depending upon the external connections made to it. Thus, the integrated circuit 12 can be used to operate any one of three different direction indicator systems and those for which it is particularly designed are those commonly known as the "British System" the "European System" and the "British Economy System".

The "European System" utilizes two pilot lamps L1 and L2 which flash in synchronism and in phase with the main indicator lamps 16 and 17 under normal conditions with the vehicle trailer attached. Should one lamp fail or the trailer be disconnected then one of the pilot lamps will cease to flash. Should two lamps fail or with the trailer disconnected one lamp fail then both pilot lamps cease to flash.

The British System comprises a single pilot lamp L1 which flashes in synchronism and in phase with the main indicator lamps 16 (and 17 if the vehicle trailer is attached) under normal conditions and which will be extinguished when one or more of the main indicator lamps fail. The system is arranged so that when the vehicle trailer is connected the sensing level at which the lamp failure is detected is modified to allow for the extra lamps on the trailer.

The British Economy System comprises a single pilot lamp which is connected across the relay contacts 14 so that it flashes in synchronism but in anti-phase with the main indicator lamps under normal conditions. In the case of one or more lamps failing the aforesaid electronic flasher circuit is stopped so that the main indicating lamps remain on and the pilot lamp remains off. The level at which lamp failure is detected is modified when the vehicle trailer is connected.

First of all, considering the European System the following additional external connections are made to the integrated circuit 12 above those hereinbefore described. Terminals F and M of the integrated circuit 12 are connected together. Terminal G of the integrated circuit 12 is connected to the base of a p n p transistor ET3 the emitter of which is connected to the supply line 10 and the collector of which is connected to supply line 11 through the series combination of diode ED3 resistor ER6 and pilot lamp L1. The terminal H of the integrated circuit 12 is connected to the base of a p n p transistor ET2, the emitter of which is connected to the supply line 10 and the collector of which is connected to supply line 11 through the series combination of diode ED2 resistor ER6 and pilot lamp L2. In the European System resistor ER4 and the contacts of the trailer plug connected to ER4 do not exist.

In operation, and when the direction indicator switch 15 is in the off position, terminal D is held towards the positive line by the resistor R10. This puts the voltage at the base of transistor T8 at its high level and the capacitor EC1 is charged towards the positive line through resistor ER1 until the voltage at the base of the transistor T2 exceeds that on the base of the transistor T8 whereupon the transistor T6 will turn off. When this happens the transistor ET1 will turn off and the relay contacts 14 will open. This condition will then be maintained until the direction indicator switch 15 is operated.

When the direction indicator switch 15 is operated, then since the relay contacts 14 are open and the lamps 16 (and 17 if connected) are low resistance, current is drawn through the resistor ER2 and the emitter base diode of transistor T9 thereby causing terminal D to be clamped at a voltage approximately equal to that of supply line 20. This puts a low reference voltage on the base of the transistor T8, the voltage on the transistor T2 remaining high, but the capacitor EC1 being discharged through the resistor ER1. When the voltage on the base of the transistor T2 falls below that on the base of the transistor T8, transistor T6 is turned on, transistor ET1 is turned on and the relay contacts close causing the lamps 16 (and 17 if connected)to light. The voltage at terminal D is now pulled close to the positive rail by the resistors ER2 and R10. The high reference voltage is now set on the base of the transistor T8 towards which the voltage on the capacitor EC1 rises until the transistor T2 and subsequently the transistor T3 turn on and the transistor T6 and therefore the transistor ET1 will turn off. The relay contacts will then open and terminal D will once again be clamped at the voltage of the supply line 20. The electronic flasher circuit will continue to oscillate until the direction indicator switch 15 is returned to the off position. The frequency of oscillation is determined by the time constant of resistor ER1 and capacitor EC1.

Capacitor EC3 connected between the said other contact of the pair of relay contacts 14 and the supply line 10 serves to suppress arcing across the contacts 14 during switching of the relay coil 13. The potential divider which consists of the resistors R20, R22, R24, R27 and R28 provides two references, namely at the junction of the resistors R22 and R24, against which the main indicator lamp currents may be compared. These references are modified to track with the changing main indicator lamp currents, due to changing battery voltage, by current drawn through resistors R25, R26 and ER3. The current to the main indicator lamps may be approximated to the form $I = XV + Y$ where $X$ and $Y$ are constants and $V$ is the voltage of the battery. $X$ is determined by the resistors R25, R26 and ER3 which influence the voltage at the junction of the resistors R24 and R27. $Y$ is determined by the voltage of the stable voltage reference of ZD1.

The voltage appearing across the current sensing resistor ER8 is level shifted through the base emitter diode of a transistor T36, the current of the transistor T36 being nominally constant and defined by the resistor R39. An approximately equal current is also caused to flow through the base emitter diode of the transistor T16 by the choice of resistors R20, R22, R24, R25, R26 R27 and R28 resulting in the reference voltages at the junction of the resistors R20 and R22 and at the junction of the resistors R22 and R24 being shifted by an equal amount to the sensed voltage. The shifted sense voltage, when the main indicator lamps 16 (and 17 if connected) are energised will be transiently high due to the initially low resistance of the cold lamps. This transient is suppressed by the resistor R37 and the capacitor EC2 so that the voltage appearing at the bases of the transistors T23 and T34 does not exhibit the transient. The resistors R21 and R23 serve to compensate for the presence of R37.

The shifted sensed voltage is compared with the higher reference voltage, namely that appearing at the junction of the resistors R20 and R22 by the long tailed pair comprising the transistors T17 and T23. The current source for the longtailed pair is provided by the transistor T18 and the resistor R29 from the reference voltage of the transistor T1, resistor R29 serving to define a reduced current from that flowing through resistor R1 and transistor T1. The transistors T19 and T21 invert the signal appearing at the collectors of the transistors T17 and T23 respectively and an output current is fed to the base of the transistor T25 when the transistor T20 is turned off and that will occur when the voltage at the base of the transistor T17 is greater than the voltage at the base of the transistor T23 thereby turning on transistors T17 and T19 and turning off transistors T23 and T21. The transistor T25 drives the transistor T26 which provides base current to the transistor ET2 which thereby energises the lamp L2. The action of the circuit is such that the lamp L2 lights if the sensed voltage is less than the higher reference voltage.

The shifted sensed voltage is compared with the lower reference voltage by the long-tailed pair comprising the transistors T29 and T34. The current source for the last mentioned long-tailed pair is provided by the transistor T35 and the resistor R38 from the reference voltage of transistor T1, resistor R38 serving to define a reduced current from that flowing through resistor R1 and transistor T1. The transistors T30 and T32 in the collectors of the transistors T29 and T34 respectively, invert the signal. An output current is fed to the base of the transistor T28 when the transistor T31 is turned off. Transistor T31 will be turned off when the voltage at the base of the transistor T29 is greater than the voltage at the base of the transistor T34 thereby turning on transistors T29 and T30 and turning off transistors T34 and T32. The transistor T28 when turned on will drive the transistor T27 which provides base current to the transistor ET3 thereby energising the lamp L1. The action of this circuit is such that the lamp L1 will be energised if the sensed voltage is less than the lower reference voltage.

When the vehicle trailer is connected to the vehicle and all the direction indicator lamps 16 and 17 are functioning properly then the shifted sensed voltage is arranged to be less than the lower reference voltage. Now, should one lamp fail or the trailer be disconnected then the pilot lamp L1 will cease to flash since the shifted sensed voltage will exceed the lower reference voltage. Should two lamps fail or with the trailer disconnected one lamp fail then both the pilot lamps L1 and L2 will cease to flash since the shifted sensed voltage will exceed the higher reference voltage.

Let us now consider the British System which requires a single pilot lamp L1. In this system terminals G and H of the integrated circuit 12 are connected together and terminals F and M are also connected together. Thus the transistors T26 and T27 will then operate in parallel and provide a greater base current to the transistor ET3, the transistor ET2 diode ED2, resistor R5 and lamp L2 not being required. Moreover, in the British System the terminal I of the integrated circuit is connected through resistor ER4 to the trailer plug 18 contacts 18 being closed when the vehicle trailer is connected. Thus, when the vehicle trailer is connected current is drawn through the resistor ER4 and terminal I becomes clamped at a diode voltage drop below the voltage on the supply line 20. The transistor T25 is deprived of base current and signals from the collector of transistors T20 are not allowed to drive the transistors T25 and T26 and hence the transistor ET3. The pilot lamp L1 will therefore be energised if the shifted sensed voltage remains below the lower reference voltage. If one or more lamps 16 or 17 fail then the shifted sensed voltage will increase above the lower reference voltage and the lamp L1 will cease to flash. When the vehicle trailer is not connected transistor T24 is held off by resistor R30 and signals from the collector of T20 are allowed to drive the base of T25. In this case, the pilot lamp L1 will be energised so long as the shifted sensed voltage is below the higher reference voltage. However, if one or more of the lamps 16 fails then the shifted sensed voltage will increase above the upper reference voltage and the pilot lamp L1 will cease to flash. The resistor R30 is chosen to ensure that the transistor T24 will be held off even in the event of a leakage current across the contacts 18 between terminal I and ground.

Let us now consider the British Economy System. For this system, transistors ET2 and ET3 diodes ED2 and ED3 resistors ER5 and ER6 and lamps L1 and L2 are not required. Terminals F, G and H of the integrated circuit 12 are connected together. The terminals F and M of the integrated circuit 12 are not directly connected. Furthermore, a pilot lamp L3 is connected between the said other contact the pair of relay contacts 14 and the supply line 10. In this system, the signal produced at terminals F, G and H will be identical to the signal produced at terminals G and H in the British System and this signal is controlled by the trailer plug 18, in the same way as it is in the British System. The resulting signal at terminals G and H is out of phase with that at terminal D under normal working conditions. If a lamp should fail terminals G and H will remain at a high voltage transistors T10 and T7 will be held off and the transistors T5 will be held on by resistors R10 and R5 thus supplying current to the transistor ET1 and holding the relay closed, irrespective of the voltage on terminal C which will tend to that on D as EC1 charges. Hence the main indicator lamps 16 (and 17 if the vehicle trailer is connected) will remain on until the direction indicator switch is turned to the off position, when the relay coil 13 will be deenergised and the main indicator lamps will be turned off.

In this system capacitor EC2 connected between terminal J of the integrated circuit 12 and the supply line 10 serves to delay the initial breaking of the main indicator lamp circuit upon operation of the direction selection switch so as to allow the current surge through the cold bulbs to pass before the relay contacts 14 open.

The electrical environment in which the circuit is required to work is extremely noisy therefore the integrated circuit and its associated external components must be protected against voltage transients.

All the terminals of the integrated circuits which connect to the supply line 11 do so through discrete resistors which will limit the current through the integrated circuit in overload conditions.

The integrated circuit provides protection for the external transistors ET1, ET2 and ET3, as follows. Under normal supply voltage conditions the voltage at the junction of resistors R25, R26 and R19 will be sufficiently low to keep the zener diodes ZD2 and ZD3 out of condition. Base current will be supplied through R18 to transistor T15 which will saturate, and hold transistors T13, T12, T11, T14, ET1, ET2 and ET3 in the off condition. Should a voltage transient occur, of a magnitude sufficiently high to cause ZD2 and ZD3 to conduct, base drive will be removed from T15 allowing T13, T12, T11 and T14 to conduct. The emitter currents of T11 and T14 are drawn from the bases of external transistors ET1, ET2 and ET3 respectively which turn on for the duration of the transient. The voltage transients then appear across the collector loads of the external transistors and the transistors themselves remain undamanged.

The integrated circuit 12 as hereinbefore described is intended for use with a 24 volt vehicle battery. However, if it is desired to use this integrated circuit 12 with a 12 volt vehicle battery then the terminals A and B of the integrated circuit 12 should be connected together as should the terminals M and N.

Finally, the lamp failure sensing circuit as hereinbefore described makes use of a capacitor to remove the voltage transient from the sensed voltage due to the low resistance of the bulbs at switch on. An alternative to this would be to provide a reference with a characteristic similar to that of the sensed voltage. Information for the timing of this ramping reference could be obtained either from the relay coil or relay contacts.

We claim:

1. A direction indicator system for a vehicle which has at least two direction indicator lamps present respectively on each side of the vehicle, comprising in combination:
   a. first and second supply lines for connection to the vehicle battery,
   b. a direction indicator switch having a movable contact with an off position and two operative positions in which the contact is connected to one of the supply lines through the direction indicator lamps on a selected side of the vehicle respectively,
   c. a series circuit coupling said movable contact to the other supply line,
   d. switching means controlling current flow in said series circuit to provide intermittent current in said series circuit when the contact is in an operative position so that the lamps on the selected side of the vehicle flash,
   e. the magnitude of said current being determined by the number of operative indicator lamps on the selected side of the vehicle, and having a first level with one lamp operative, a second and higher level with two lamps operative, and a third and higher level with three lamps operative,
   f. a resistance chain connected across said supply lines,
   g. a first comparator having one input to a point on said resistance chain and a second input from said series circuit, said first comparator switching from a first state to a second state when the current flow in the series circuit is above said first level,
   h. a first output being obtained from said first comparator when said first comparator is in its second state,
   i. a second comparator having one input to a different point on said resistance chain and a second input from said series circuit, said second comparator switching from a first state to a second state when the current flow in the series circuit is above said second level,
   j. a second output being obtained from said second comparator when said second comparator is in its second state, and
   k. pilot lamp means coupled to said comparators for indicating failure of a direction indicator lamp.

2. A system as claimed in claim 1 in which said pilot lamp means comprises a first pilot lamp connected to said first output and is turned on when said first comparator is in its second state, and a second pilot lamp connected to said second output and is turned on when said second comparator is in its second state.

3. A system as claimed in claim 1 in which said pilot lamp means comprises a pilot lamp connected to said first and second outputs from said comparators respectively and turned on when said second comparator is in its second state, and also turned on when said first comparator is in its second state with two indicator lamps present, and means preventing the first output from operating said pilot lamp with said first comparator in said second state and three indicator lamps present.

4. A system as claimed in claim 1 in which said pilot lamps means comprises a pilot lamp placed across said switching means, and wherein said first and second outputs from said comparators respectively are connected to said switching means, said switching means causing said indicator lamps to flash when said second comparator is in its second state, and also causing said indicator lamps to flash when said first comparator is in its second state with two indicator lamps present and means preventing the first output from causing said switching means to operate said indicator lamps with said first comparator in said second state and three indicator lamps present.

5. A system as claimed in claim 3 including electrical connection means on the vehicle adapted for connection to complimentary means on a trailer, said means comprising a switch which is operated when the electrical connection means and the complimentary means are engaged.

6. A system as claimed in claim 4 including electrical connection means on the vehicle adapted for connection to complimentary means on a trailer, said means comprising a switch which is operated when the electrical connection means and the complimentary means are engaged.

7. A system as claimed in claim 1 including delay means coupling the series circuit to the comparators to prevent operation of the comparator as a result of transient high currents when the direction indicator lamps are turned on.

8. A system as claimed in claim 1 including means automatically varying the inputs to the comparators from the resistance chain with changes in voltage across said first and second supply lines.

9. A system as claimed in claim 3 including an integrated circuit having a first terminal connected to the first supply line, a second terminal connected to the second supply line through a resistor, and a third terminal connected to the second supply line through a further resistor, the integrated circuit incorporating a Zener diode bridging the first and second terminals, and said resistance chain including first, second, third and fourth resistors bridging the first and second terminals, the input to the first comparator being taken from the junction of the second and third resistors, the input to the second comparator being taken from the junction of the first and second resistors, and the third terminal being connected through a resistor to the junction of the third and fourth resistors.

10. A direction indicator system for a vehicle which has a plurality of direction indicator lamps on each side of the vehicle, comprising in combination:
 a. first and second supply lines for connection to the vehicle battery,
 b. a direction indicator switch having a movable contact with an off position and two operative positions in which the contact is connected to one of the supply lines through the direction indicator lamps on one or other side of the vehicle respectively,
 c. a series circuit coupling said movable contact to the other supply line,
 d. switching means controlling current flow in said series circuit to provide intermittent current in said series circuit when the contact is in an operative position so that the lamps on the selected side of the vehicle flash,
 e. the magnitude of said current being determined by the number of operative direction indicator lamps on the selected side of the vehicle, and having a first level with one lamp operative, a second and higher level with two lamps operative, and a third and higher level with three lamps operative,
 f. a resistance chain connected across said supply lines,
 g. a first comparator having one input to a point on said resistance chain and a second input from said series circuit, said first comparator switching from a first state to a second state when the current flow in the series circuit is above said first level,
 h. first pilot lamp coupled to said first comparator and being turned on when the first comparator is in its second state,
 i. a second comparator having one input to a different point on said resistance chain and a second input from said series circuit, said second comparator switching from a first state to a second state when the current flow in the series circuit is above said second level, and
 j. a second pilot lamp coupled to said second comparator and being turned on when the second comparator is in its second state.

11. A system as claimed in claim 10 in which the resistance chain and the comparators are formed on an integrated circuit but the comparators drive their respective pilot lamps by way of transistors positioned externally from the integrated circuit, the integrated circuit incorporating voltage sensitive means for switching on transistors in the integrated circuit to protect the externally positioned transistors.

* * * * *